United States Patent [19]
Okita

[11] Patent Number: 5,406,564
[45] Date of Patent: Apr. 11, 1995

[54] COMMUNICATION LINE BACKUP SYSTEM

[75] Inventor: Ryoji Okita, Kawasaki, Japan

[73] Assignee: Fujitsu Limited, Kawasaki, Japan

[21] Appl. No.: 796,421

[22] Filed: Nov. 22, 1991

[30] Foreign Application Priority Data

Nov. 27, 1990 [JP] Japan ................................. 2-323965

[51] Int. Cl.⁶ .............................................. H04L 1/22
[52] U.S. Cl. ...................................... 371/8.2; 370/16; 379/27
[58] Field of Search ........................... 371/8.2; 370/16; 379/27, 28

[56]         References Cited
        U.S. PATENT DOCUMENTS

| 4,932,050 | 6/1990 | Davidson et al. | 379/211 |
| 5,138,609 | 8/1992 | Hashimoto | 370/16 |
| 5,193,086 | 3/1993 | Satomi et al. | 370/16 |
| 5,210,740 | 5/1993 | Anzai et al. | 370/16 |
| 5,226,037 | 7/1993 | Satomi et al. | 370/16 |

FOREIGN PATENT DOCUMENTS

| 3642378 | 6/1988 | Denmark . |
| 327128 | 8/1989 | European Pat. Off. . |
| 332199 | 9/1989 | European Pat. Off. . |
| 332792 | 9/1989 | European Pat. Off. . |
| 2592253 | 6/1987 | France . |
| 77536 | 5/1985 | Japan . |
| 271549 | 11/1987 | Japan . |
| 238234 | 9/1989 | Japan . |
| 273434 | 11/1989 | Japan . |
| 311627 | 12/1989 | Japan . |
| 189050 | 7/1990 | Japan . |
| 34642 | 2/1991 | Japan . |
| 642209 | 3/1984 | Switzerland . |

*Primary Examiner*—Charles E. Atkinson
*Attorney, Agent, or Firm*—Greer, Burns & Crain, Ltd.

[57]            ABSTRACT

A communication line backup system provides a backup line for backing up a communication line which connects first and second subscriber terminals. The communication line backup system includes a first backup unit which is coupled to the first subscriber terminal, a second backup unit which is coupled to the second subscriber terminal, and an integrated services digital network (ISDN) which is coupled to the first and second backup units via ISDN channels. The first and second backup units include a backup part for forming a backup communication channel between the first and second subscriber terminals in response to a failure which is generated on the communication line between the first and second subscriber terminals, and the backup communication channel is formed by at least one channel within the ISDN channels established in the integrated services digital network.

8 Claims, 12 Drawing Sheets

FIG. 5

COMMUNICATION LINE BACKUP SYSTEM

BACKGROUND OF THE INVENTION

The present invention generally relates to communication line backup systems, and more particularly to a communication line backup system which can establish a backup line between subscriber terminals via a communication switching network when a failure occurs on a communication line.

In the conventional telephone and telegraph switching network and in the integrated services digital network (ISDN) which may possibly replace the conventional telephone and telegraph switching network, a failure may occur on a leased line or a normal line which is used between subscribers. In order to continue the communication even after the failure occurs, a backup line must generally be provided within the communication network.

FIG. 1 shows an example of a conventional communication line backup system. In FIG. 1, subscriber terminals 102 and 104 are coupled via a leased line 106. A modem 108 is provided between the subscriber terminal 102 and the leased line 106, and a modem 110 is provided between the subscriber terminal 104 and the leased line 106. This backup system uses a telephone switching network 112.

However, even when a telephone line of the telephone switching network 112 is used as the backup line between the subscriber terminals 102 and 104, the telephone line which is used for the backup is not always the same. For this reason, the connection route within the telephone switching network 112 is established depending on the congestion of the telephone switching network 112.

If different telephone lines are established for the backup, the line quality varies depending on the telephone line which is used as the backup line. This variation in the line quality affects the communication as the transmission rate of the modems 108 and 110 becomes high, on the order of 19.2 kbps, for example. Accordingly, it is difficult to provide a stable backup connection using the telephone switching network 112 in which the line quality deterioration described above occurs.

On the other hand, it is conceivable to use the ISDN for the backup system. However, in a communication switching network in which the existing telephone switching network and the ISDN coexist, a telephone line backup unit which is used in the existing telephone switching network cannot be connected to an ISDN backup unit which backs up ISDN terminals within the ISDN. For this reason, it becomes necessary to use two kinds of backup systems, that is, the backup system for the telephone line and the backup system for the ISDN. As a result, the maintenance and management of the communication in such a communication switching network becomes complex.

SUMMARY OF THE INVENTION

Accordingly, it is a general object of the present invention to provide a novel and useful communication line backup system in which the problems described above are eliminated.

Another and more specific object of the present invention is to provide a communication line backup system which provides a backup line for backing up a communication line which connects first and second subscriber terminals, comprising a first backup unit which is coupled to the first subscriber terminal, a second backup unit which is coupled to the second subscriber terminal, and an integrated services digital network (ISDN) which is coupled to the first and second backup units via ISDN channels, where the first and second backup units include backup means for forming a backup communication channel between the first and second subscriber terminals in response to a failure which is generated on the communication line between the first and second subscriber terminals, and the backup communication channel is formed by at least one channel within the ISDN channels established in the integrated services digital network. According to the communication line backup system of the present invention, it is possible to provide a backup communication channel via the integrated services digital network when the failure is generated on the communication line between the first and second subscriber terminals.

Still another object of the present invention is to provide a communication line backup system which provides a backup line for backing up a communication line which connects first and second subscriber terminals, comprising a first backup unit which is coupled to the first subscriber terminal, a second backup unit, coupled to the second subscriber terminal, for backing up a telephone line, an integrated services digital network (ISDN) which is coupled to the first backup unit via ISDN channels, and a telephone line switching network which is coupled between the second backup unit and the integrated services digital network, where the second backup unit is coupled to the telephone line switching network via two backup telephone lines, the first backup unit includes backup means for forming a backup communication channel between the first and second subscriber terminals in response to a failure which is generated on the communication line between the first and second subscriber terminals, and the backup communication channel is formed by a first channel which is within the ISDN channels established in the integrated services digital network and connects to one of the two backup telephone lines and a second channel which is within the ISDN channels established in the integrated services digital network and connects to the other of the two backup telephone lines. According to the communication line backup system of the present invention, it is possible to provide the backup communication channel via a communication network in which the integrated services digital network and the telephone line switching network coexist. Hence, the backup communication channel can be provided with a high degree of flexibility in that the existing telephone line backup unit is effectively utilized.

Other objects and further features of the present invention will be apparent from the following detailed description when read in conjunction with the accompanying drawings.

BRIEF DESCRIPTION OF THE DRAWINGS

FIG. 5 is a system block diagram showing an ISDN backup unit shown in FIGS. 3 and 4;

DESCRIPTION OF THE PREFERRED EMBODIMENTS

First, a description will be given of the operating principle of the present invention, by referring to FIGS. 2A and 2B.

Figure 1:
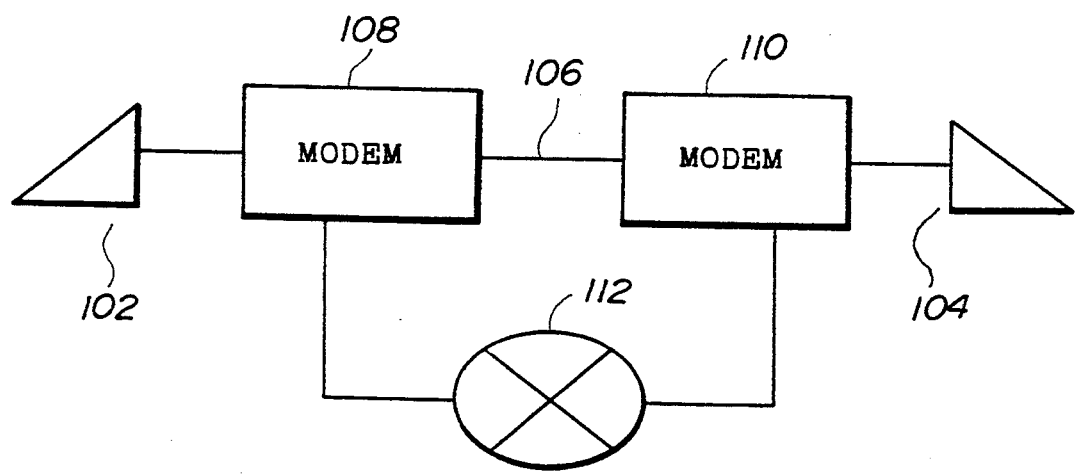
FIG. 1 is a system block diagram for explaining an example of a conventional communication line backup system.
Figure 2A:
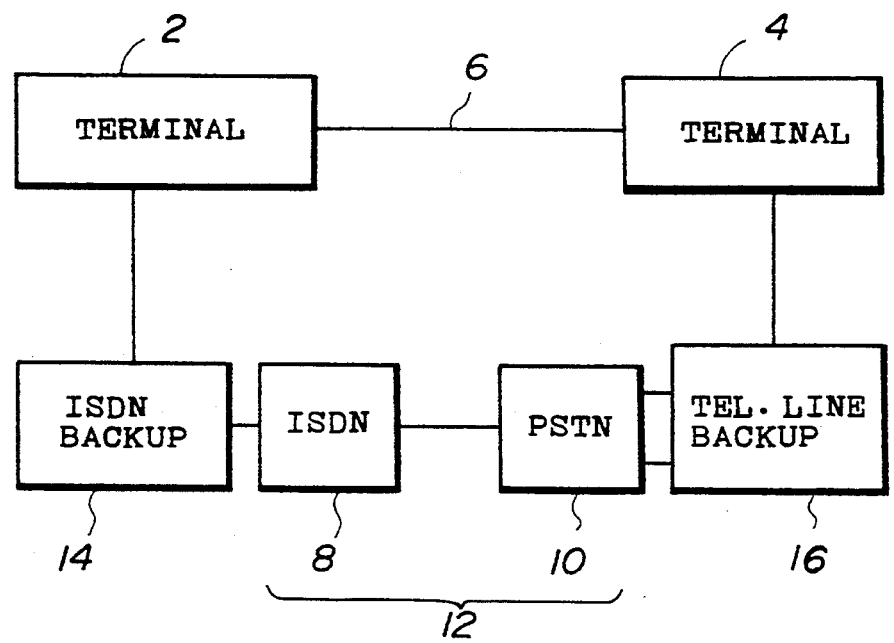
FIGS. 2A and 2B respectively are system block diagrams for explaining the operating principle of the present invention.

FIG. 2A shows one aspect of the present invention. As shown in FIG. 2A, subscriber terminals 2 and 4 can be connected via a communication line 6. On the other hand, the subscriber terminal 2 is coupled to an ISDN backup unit 14, while the subscriber terminal 4 is coupled to a telephone line backup unit 16. The ISDN backup unit 14 is coupled to an ISDN 8, and the telephone line backup unit 16 is coupled to a telephone line switching network (public switched telephone network or PSTN) 10 via two backup telephone lines. The ISDN 8 and the telephone line switching network 10 are coupled to each other and form a communication network 12 which provides an ISDN-PSTN inter-working function.

A connection process control is made between the ISDN backup unit 14 and the telephone line backup unit 16 via the ISDN-PSTN inter-working function of the communication network 12 in response to a failure in the communication line 6, so that first and second backup communication channels are provided between the subscriber terminals 2 and 4. The first backup communication channel connects a first B-channel of the ISDN channels of the ISDN 8 and a first one of the two backup telephone lines. The second backup communication channel connects a second B-channel of the ISDN channels of the ISDN 8 and a second one of the two backup telephone lines. Hence, a normal communication can be continued between the subscriber terminals 2 and 4 using the first and second backup communication channels even when a failure occurs in the communication line 6.

Figure 2B:
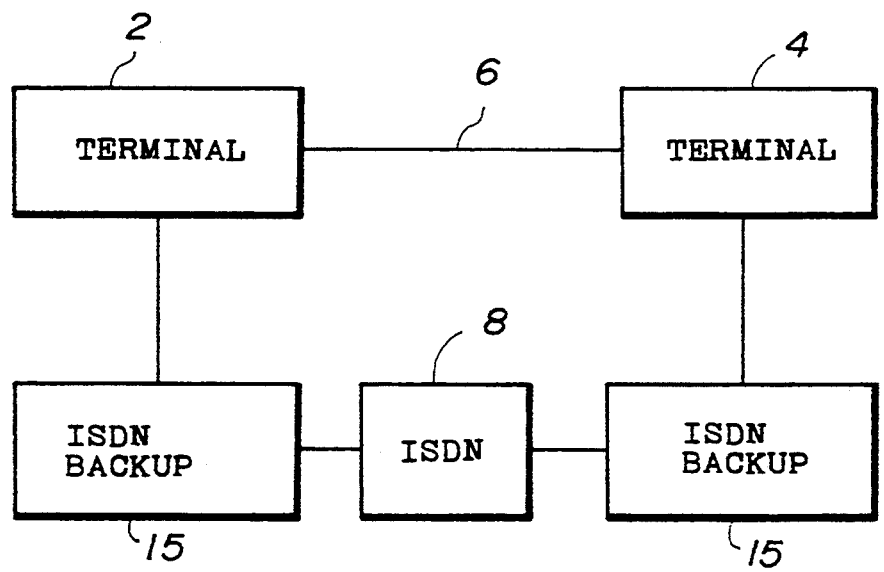

FIG. 2B shows another aspect of the present invention. In FIG. 2B, those parts which are the same as those corresponding parts in FIG. 2A are designated by the same reference numerals, and a description thereof will be omitted. In FIG. 2B, the subscriber terminal 2 is coupled to an ISDN backup unit 15, and the subscriber terminal 4 is coupled to another ISDN backup unit 15. The two ISDN backup units 15 are coupled via the ISDN channels of the ISDN 8.

A connection process control is made between the two ISDN backup units 15 via the ISDN 8 in response to a failure in the communication line 6, so that the backup communication channel is provided between the subscriber terminals 2 and 4. The B-channel of the ISDN channels of the ISDN 8 is used as the backup communication channel between the subscriber terminals 2 and 4. Hence, a normal communication can be continued between the subscriber terminals 2 and 4 using the backup communication channel even when a failure occurs in the communication line 6.

Therefore, according to the present invention, it is possible to establish, via different communication switching network, a backup line for a communication line in which a failure is generated. For example, if a subscriber terminal which requires a backup line is a terminal existing within a telephone line switching network, it is possible to utilize backup units and establish a backup line between the backup units even when the subscriber terminal is a telephone terminal which can establish a backup line which connects to another telephone terminal within the telephone line switching network.

Next, a description will be given of first and second embodiments of a communication line backup system according to the present invention, by referring to FIGS. 3 and 4.

Figure 3:
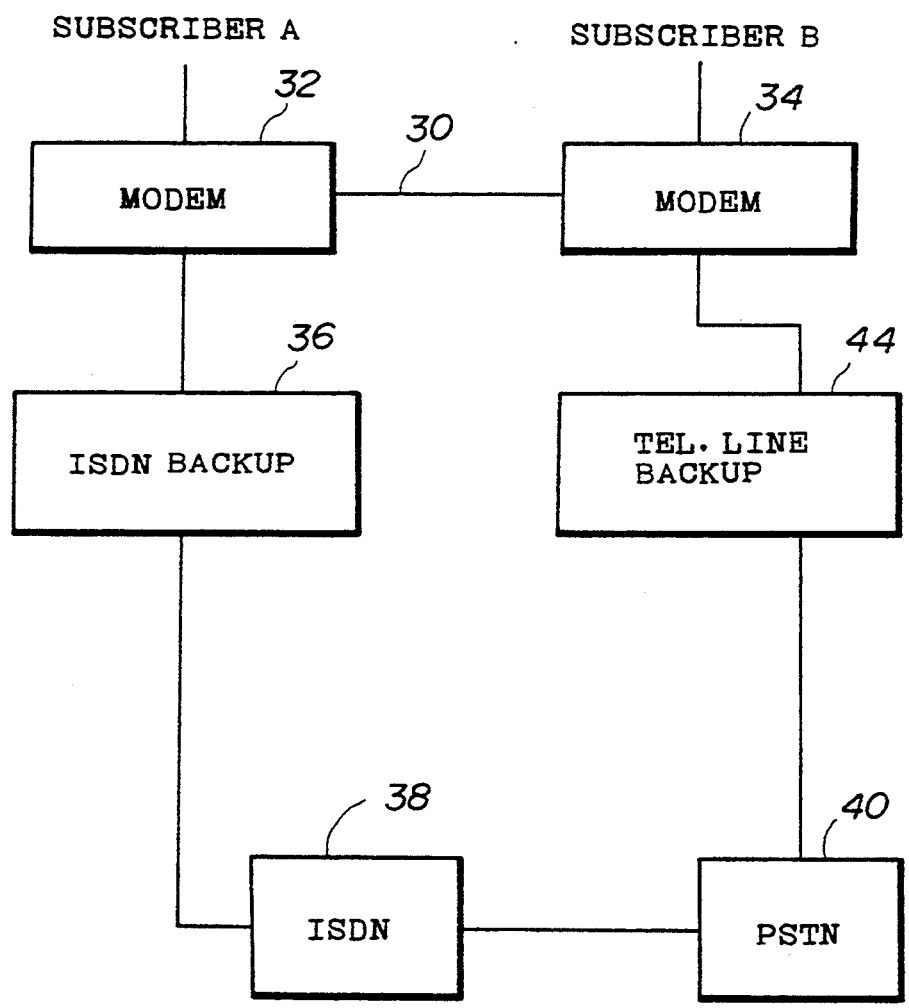
FIG. 3 is a system block diagram showing a first embodiment of a communication line backup system according to the present invention.

In the first embodiment shown in FIG. 3, a subscriber A can communicate with a subscriber B via a leased line 30 which connects modems 32 and 34. The modems 32 and 34 may respectively be regarded as parts of the subscriber terminals of the subscribers A and B. A backup means is provided in order to cope with a failure which occurs on the leased line 30. The backup means includes an ISDN backup unit 36 which is coupled to the modem 32 of the subscriber A, an ISDN 38 which is coupled to the ISDN backup unit 36, a telephone line backup unit 44 which is coupled to the modem 44 of the subscriber B, and a PSTN 40 which is coupled to the telephone line backup unit 44. The ISDN 38 and the PSTN 40 are coupled to each other.

Figure 4:
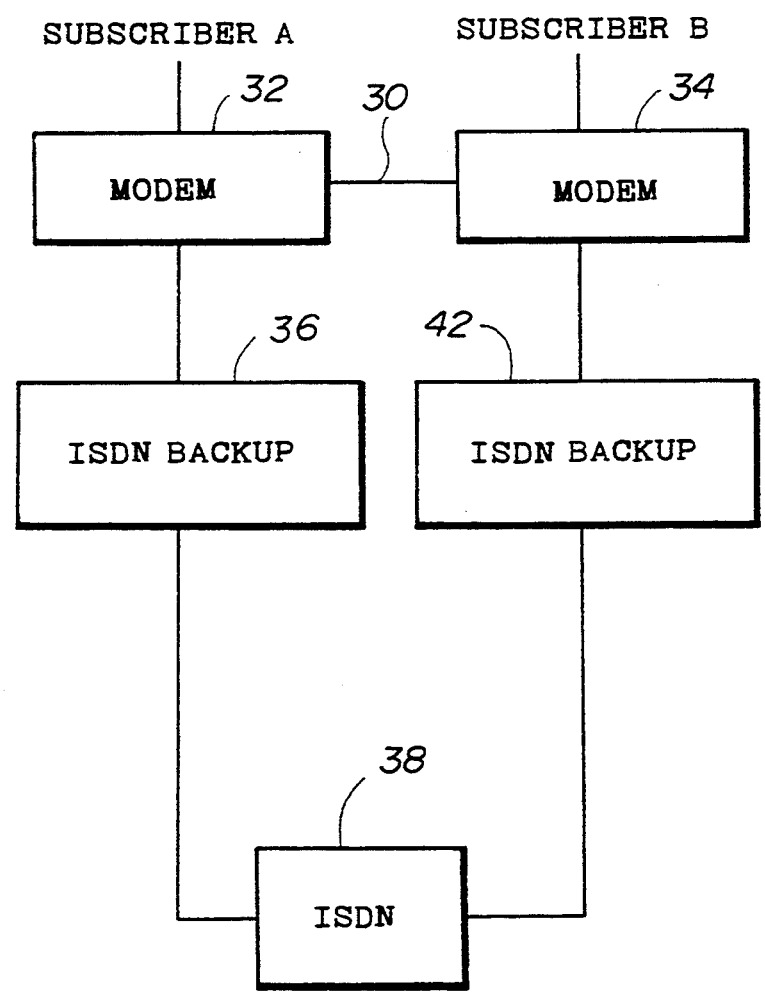
FIG. 4 is a system block diagram showing a second embodiment of the communication line backup system according to the present invention.

In the second embodiment shown in FIG. 4, those parts which are the same as those corresponding parts in FIG. 3 are designated by the same reference numerals, and a description thereof will be omitted. In this embodiment, a backup means includes the ISDN backup unit 36 which is coupled to the modem 32 of the subscriber A, an ISDN backup unit 42 which is coupled to the modem 34 of the subscriber B, and the ISDN 38 which is coupled between the ISDN backup units 36 and 42.

In FIGS. 3 and 4, the subscriber terminals including the respective modems 32 and 34 correspond respectively to the subscriber terminals 2 and 4 shown in FIGS. 2A and 2B. The leased line 30 corresponds to the communication line 6 shown in FIGS. 2A and 2B. The ISDN 38 corresponds to the ISDN 8 shown in FIGS. 2A and 2B, and the PSTN 40 corresponds to the telephone line switching network 10 shown in FIG. 2A. The ISDN 38 and the PSTN shown in FIG. 3 correspond to the communication network 12 shown in FIG. 2A, and the ISDN 38 shown in FIG. 4 corresponds to the communication network 12 shown in FIG. 2B. The ISDN backup units 36 and 42 respectively correspond to the ISDN backup units 14 and 15 shown in FIGS. 2A and 2B. The telephone line backup unit 44 corresponds to the telephone line backup unit 16 shown in FIG. 2A.

In the first and second embodiments, only the ISDN backup units 36 and 42 are novel, and the other elements themselves are known. Hence, a detailed description will hereinafter be made only with respect to the ISDN backup units 36 and 42.

Figure 5:
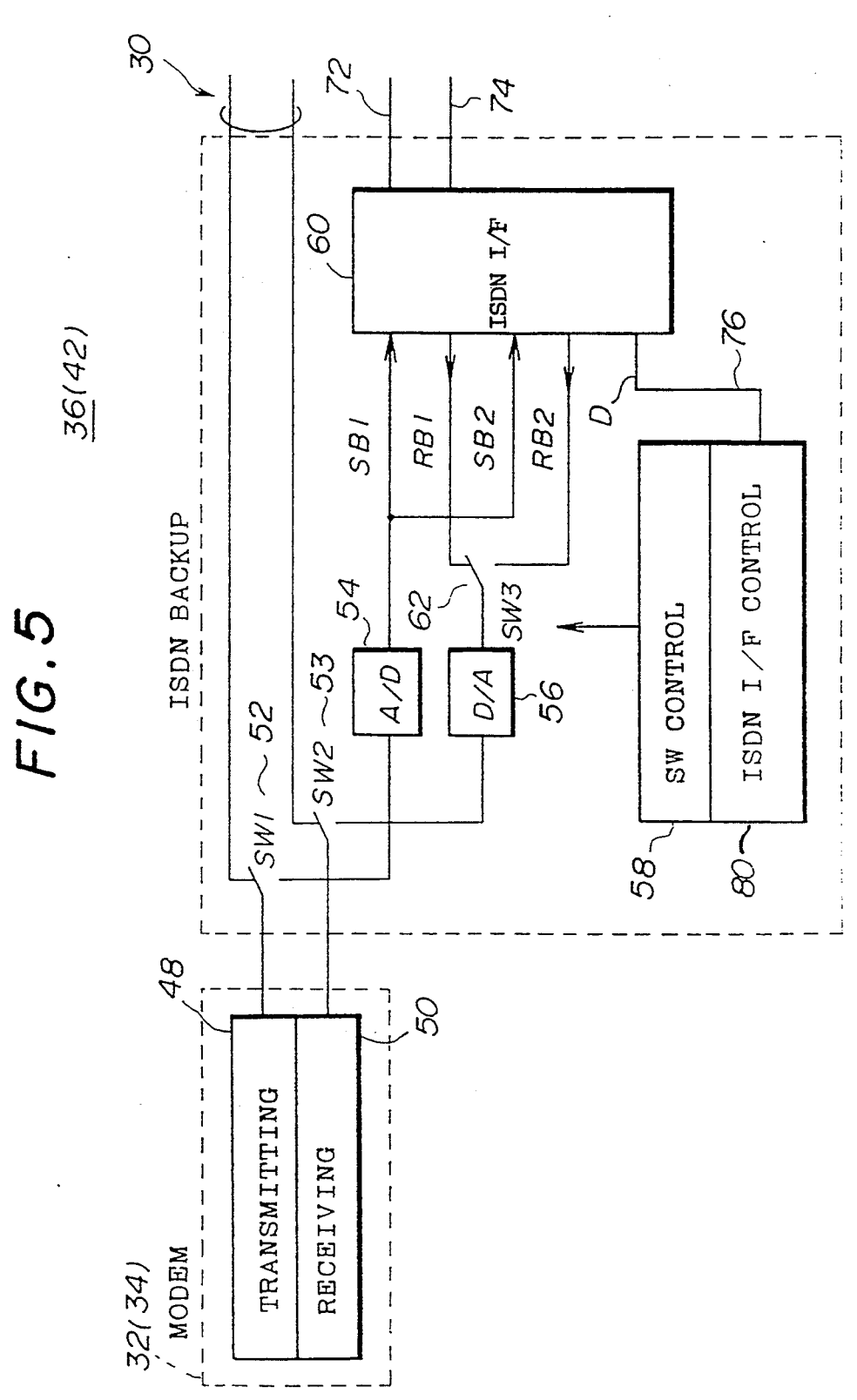

FIG. 5 shows an embodiment of the ISDN backup unit 36 (or 42). The ISDN backup unit 36 (or 42) includes switches 52, 53 and 62, an analog-to-digital (A/D) converter 54, a digital-to-analog (D/A) converter 56, a switching controller 58, an ISDN interface circuit 60, and an ISDN interface circuit controller 80 which are connected as shown.

The switches 52 and 53 connect the modem 32 (or 34) to the leased line 30 or to the A/D converter 54 and the D/A converter 56. More particularly, the switching controller 58 controls the switches 52 and 53 so that the modem 32 (or 34) is connected to the leased line 30 or, a transmitting part 48 of the modem 32 (or 34) is connected to the A/D converter 54 and a receiving part 50 of the modem 32 (or 34) is connected to the D/A converter 56. An output of the A/D converter 54 is supplied to the ISDN interface circuit 60. On the other hand, an input of the D/A converter 56 is coupled to the ISDN interface circuit 60 via the switch 62.

Figure 6:
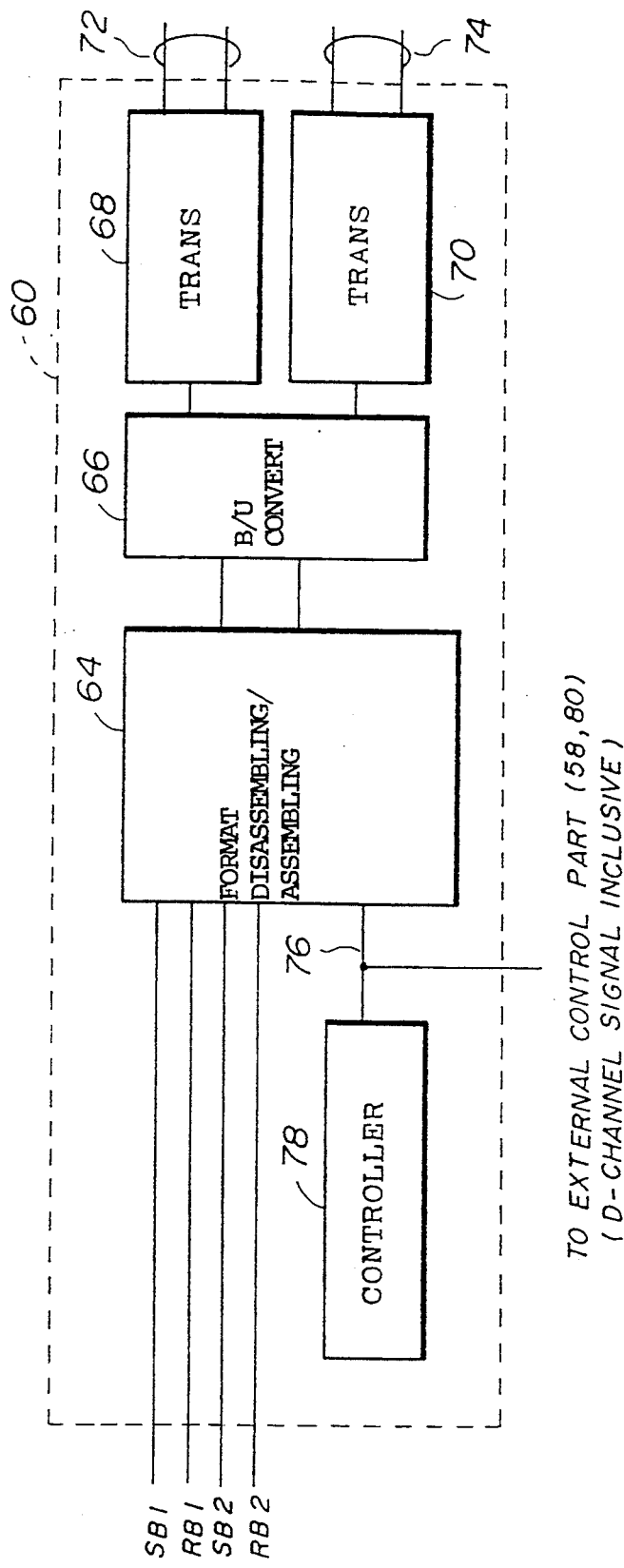
FIG. 6 is a system block diagram showing an ISDN interface circuit shown in FIG. 5.

FIG. 6 shows an embodiment of the ISDN interface circuit 60. The ISDN interface circuit 60 includes a format disassembling/assembling part 64, a bipolar-unipolar (B/U) converting circuit 66, line transformers 68 and 70, and a controller 78 which are connected as shown. The output of the A/D converter 54 is connected directly to a transmitting B1-channel SB1 and a transmitting B2-channel SB2 of the format disassembling/assembling part 64, where the notation SB is used hereinafter for the transmission from the subscriber A to the subscriber B. The input of the D/A converter 56 is connected via the switch 62 to a receiving B1-channel RB1 and a receiving B2-channel RB2 of the format disassembling/assembling part 64, where the notation RB is used hereinafter for the reception by the subscriber A from the subscriber B.

The format disassembling/assembling part 64 is coupled via the B/U converting circuit 66 to the line transformer 68 which transmits signals to the ISDN 38. The format disassembling/assembling part 64 is coupled via the B/U converting circuit 66 to the line transformer 70 which receives signals from the ISDN 38. ISDN lines 72 and 74 are coupled to the ISDN 38 via a DSU (not shown).

The format disassembling/assembling part 64 is also coupled to the controller 78 via a control information line 76, and is coupled to the ISDN interface circuit controller 80 shown in FIG. 5. The ISDN interface circuit controller 80 controls the switching controller 58. The control information line 76 is used for transmitting and receiving signals including the D-channel.

The ISDN 38 is constructed so that ISDN channels of 2B+D can be established between the ISDN backup unit 36 and the ISDN 38 or, between the ISDN backup unit 42 and the ISDN 38.

When transmitting to the ISDN 38, the format disassembling/assembling part 64 assembles the frames by inserting each bit of unipolar signal type information transmitted to the transmitting B1-channel SB1, the transmitting B2-channel SB2 and the D-channel into a corresponding bit position within the transmitting frames on the ISDN line 72 as shown in FIG. 7(B). On the other hand, when receiving from the ISDN 38, the format disassembling/assembling part 64 disassembles each bit of bipolar signal type information received at the corresponding bit position within the receiving frames on the ISDN line 74 as shown in FIG. 7(A) to the receiving B1-channel RB1, the receiving B2-channel RB2 and the D-channel in the form of the corresponding unipolar signal type. During the assembling process, the conversion of the unipolar signal type transmitting information into the bipolar signal type is made in the B/U converting circuit 66 which drives the line transformer 68. In addition, during the disassembling process, the conversion of the bipolar signal type receiving information from the line transformer into the unipolar signal type is made by the B/U converting circuit 66 which receives the bipolar signal type receiving information.

Figure 7:
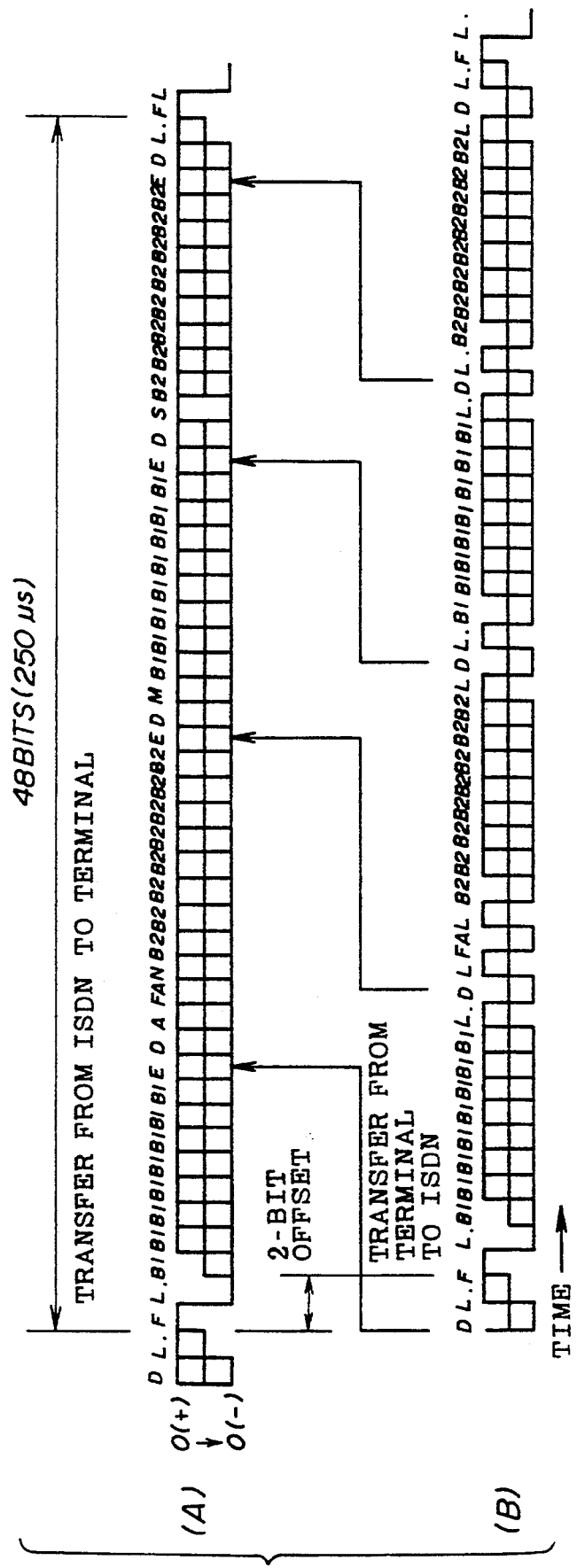
FIG. 7 is a diagram for explaining frames of ISDN channels.

In FIG. 7, F denotes the framing bit, L denotes the D.C. balancing bit, D denotes the D-channel bit, E denotes the D-echo-channel bit, FA denotes an auxiliary frame bit, N denotes a bit set to a binary value N=FX (ISDN to terminal direction), B1 denotes a bit within B-channel 1, B2 denotes a bit within B-channel 2, A denotes a bit used for activation, S denotes a bit reserved for future standardization, and M denotes a multi framing bit.

Next, a description will be given of the operation of the backup line system of the first and second embodiments.

For the sake of convenience, the operation of the backup line system in the second embodiment will be described first. In this case, the subscribers A and B are respectively coupled to the ISDN backup units 36 and 42 as shown in FIG.4, and the subscribers A and B are coupled via the leased line 30.

Figure 8:
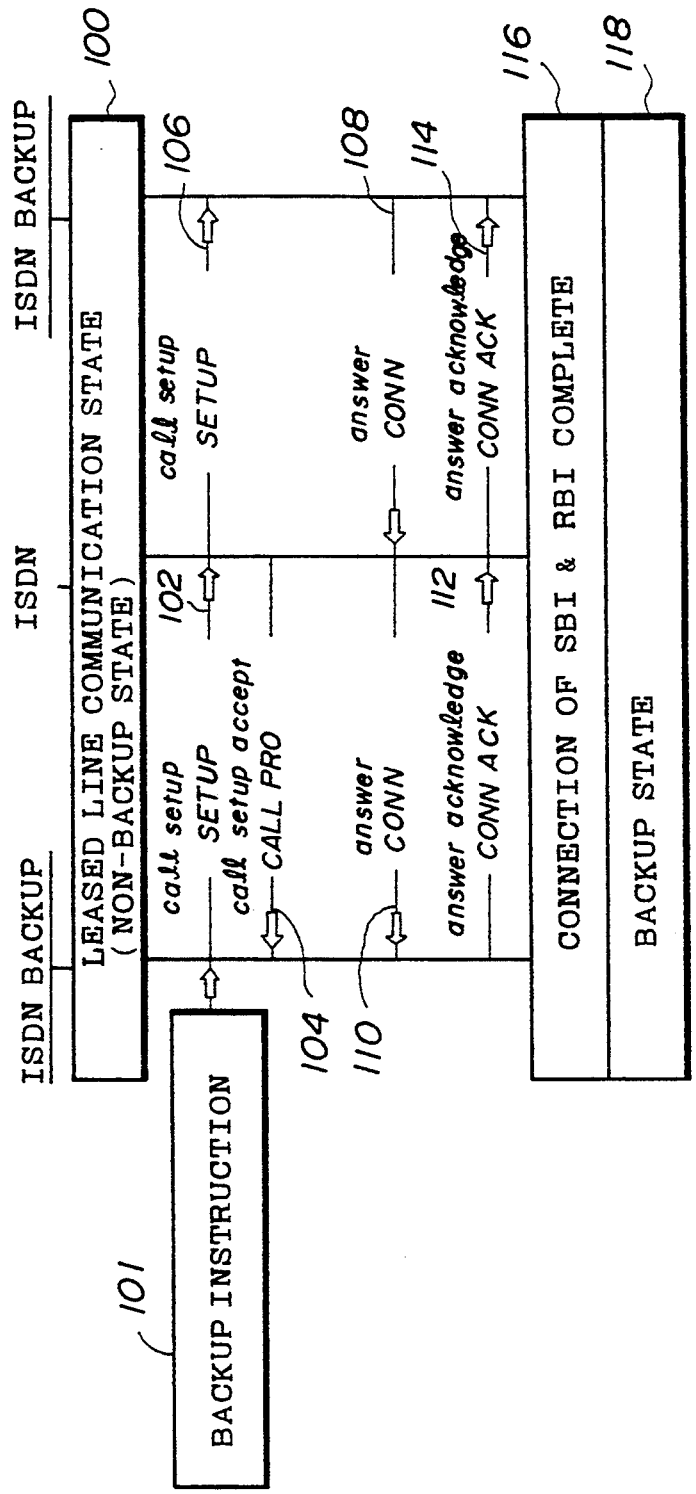
FIG. 8 is a diagram for explaining a backup connection sequence when both transmitting and receiving ends are ISDN terminals.

When a failure occurs on the leased line 30 during a communication 100 shown in FIG. 8 between the subscribers A and B, a backup instruction for backing up the leased line 30 is supplied to the controller 78 in the ISDN backup unit 36, for example. This backup instruction may be obtained in various manners including, (i) a manual operation, (ii) a remote control from a modem network supervision system, and (iii) an automatic backup control system activated by a line state supervisor of the modem. In the case (iii) described above, the backup instruction is supplied to the controller 78 from the modem 32, for example.

The controller 78 which receives the backup instruction transmits and receives messages described below using the D-channel within the ISDN lines 72 and 74 which is formed between the ISDN 38, via the format disassembling/assembling part 64, the B/U converting circuit 66 and the line transformers 68 and 70. The D-channel within the ISDN line 72 is used to transmit the message from the ISDN backup unit 36 to the ISDN 38. The D-channel within the ISDN line 74 is used to receive the message from the ISDN 38 by the ISDN backup unit 36. The above described relationship related to the use of the D-channel is also the same for the transmission and reception of messages between the ISDN 38 and the ISDN backup unit 42. Hence, a description related to the interaction between the ISDN 38 and the ISDN backup unit 42 will be omitted for the sake of convenience.

As described above, a call setup message SETUP is transmitted from the ISDN interface circuit 60 to the ISDN 38 in a step 102 shown in FIG. 8 under the control of the controller 78. The ISDN 38 returns a call setup accept message CALL_PRO to the calling ISDN backup unit 36 in a step 104, in response to the call setup message SETUP. In addition, the ISDN 38 transmits the call setup message SETUP to the other ISDN backup unit 42 in a step 106. Responsive to the call setup message SETUP, the ISDN backup unit 42 returns an answer message CONN to the ISDN 38 in a step 108, and this answer message CONN is returned to the ISDN backup unit 36 in a step 110. The ISDN backup unit 36 then returns an answer acknowledge message CONN_ACK to the ISDN 38 in a step 112, and this answer acknowledge message CONN_ACK is returned to the ISDN backup unit 42 in a step 114.

As a result, the B1-channel of the ISDN line 72 is used as the transmitting B1-channel SB1 and the B1-channel of the ISDN line 74 is used as the receiving B1-channel RB1, so as to form a backup line (pair) between the subscribers A and B. In order to complete this backup line (pair) between the subscribers A and B using the transmitting B1-channel SB1 and the receiving B1-channel RB1, the ISDN interface circuit controller 80 which receives the backup instruction via the control information line 76 controls the switching controller 58 in a step 116 so as to switch the switches 52 and 53. More particularly, the ISDN interface circuit controller 80 controls the switching controller 58 so that the transmitting part of the modem 32 is connected to the transmitting B1-channel SB1 of the ISDN line 72 via the switch 52 and the receiving part of the modem 32 is connected to the receiving B1-channel RB1 of the ISDN line 74 via the switch 53. Therefore, the leased line 30 on which the failure is generated is backed up in a step 118 by the backup line (pair) which is formed as described above. For this reason, it is possible by use of the backup line (pair) to normally continue the communication which was being made via the leased line 30 even after the failure is generated.

Next, a description will be given of the operation of the backup line system in the first embodiment. In this case, the subscribers A and B are coupled via the leased line 30, but the subscriber B uses the telephone line backup unit 44 as shown in FIG. 3. Hence, the ISDN-PSTN inter-working function described above is provided between the ISDN 38 and the PSTN 40.

Figure 9:
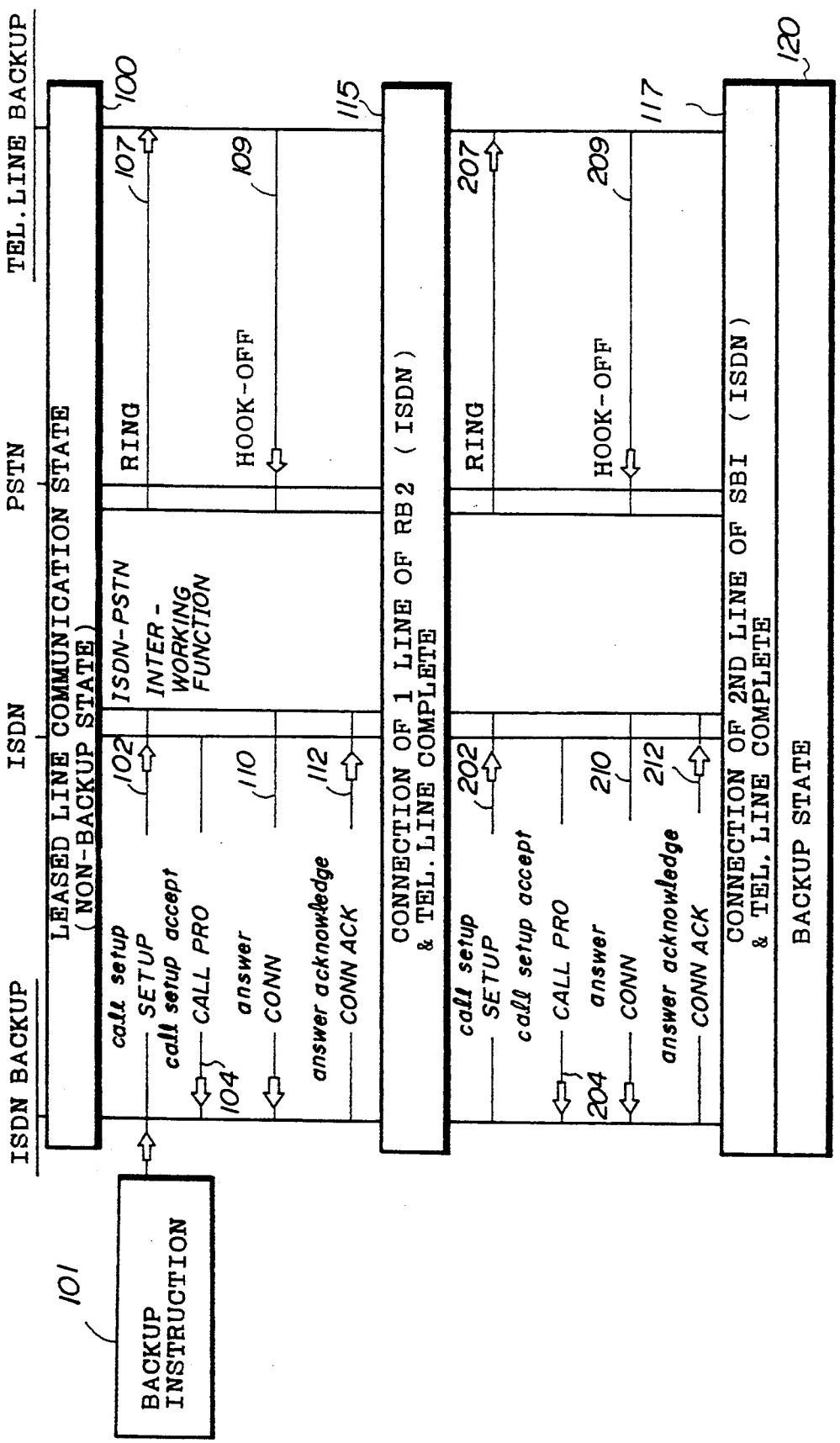
FIG. 9 is a diagram for explaining a backup connection sequence when providing a backup between an ISDN terminal and telephone line terminal by transmission from the ISDN terminal.

When a failure occurs on the leased line 30 during a communication 100 shown in FIG. 9 between the subscribers A and B, a backup instruction for backing up the leased line 30 is supplied from the subscriber A or B. A description will first be given of a case where the subscriber A supplies the backup instruction.

When the backup instruction is supplied from the subscriber A in a step 101, a call setup message SETUP is transmitted from the ISDN backup unit 36 to the ISDN 38 in a step 102 shown in FIG. 9. The ISDN 38 returns a call setup accept message CALL_PRO to the calling ISDN backup unit 36 in a step 104, in response to the call setup message SETUP. In addition, when the ISDN 38 receives the call setup message SETUP, the ISDN 38 in a step 107 transmits a ringer signal RING from the PSTN 40 to the telephone line backup unit 44 using the ISDN-PSTN inter-working function. When the subscriber B answers the call, an answer signal HOOK-OFF is returned from the telephone line backup unit 44 to the PSTN 40 in a step 109, similarly as in the conventional case. When the PSTN 40 receives the answer signal HOOK-OFF, an answer message CONN is transmitted from the ISDN 38 to the ISDN backup unit 36 in a step 110 using the ISDN-PSTN inter-working function. The ISDN backup unit 36 returns an answer acknowledge message CONN_ACK in a step 112 in response to the answer message CONN.

The messages used for making the connection control are the same as those used in the above described case where both backup units are ISDN backup units.

At the ISDN backup unit 36 which receives the answer message CONN, switching control information is transferred from the controller 78 to the ISDN interface circuit controller 80 via the control information line 76. Hence, a switching signal is supplied from the ISDN interface circuit controller 80 to the switching controller 58 in a step 115 to switch the switch 62 and also switch the switches 52 and 53. As a result, the receiving B2-channel RB2 of the ISDN line 74 is connected to a first telephone line which is established between the PSTN 40 and the telephone line backup unit 44, thereby forming a first backup communication channel from the subscriber B within the backup line system to the subscriber A.

After forming the first backup communication channel from the subscriber B to the subscriber A, the following connection process is made automatically to form a second backup communication channel from the subscriber A to the subscriber B. The procedure for making this connection process is basically the same as the procedure used to form the first backup communication channel from the subscriber B to the subscriber A, as may be seen from steps 202, 204, 207, 209, 210 and 212 shown in FIG. 9.

After this connection process is completed, the transmitting B1-channel SB1 of the ISDN line 72 is connected in a step 117 to a second telephone line which is established between the PSTN 40 and the telephone line backup unit 44, thereby forming the second backup communication channel from the subscriber A to the subscriber B. Therefore, a backup line (pair) is formed in a step 120 to backup the leased line 30 on which the failure is generated, and the communication between the subscribers A and B can be continued normally even after the failure is generated between the subscribers A and B on the leased line 30.

Next, a description will be given of a case where the subscriber B supplies the backup instruction when a failure is generated on the leased line 30 which is used for the communication 100 shown in FIG. 10 between the subscribers A and B.

Figure 10:
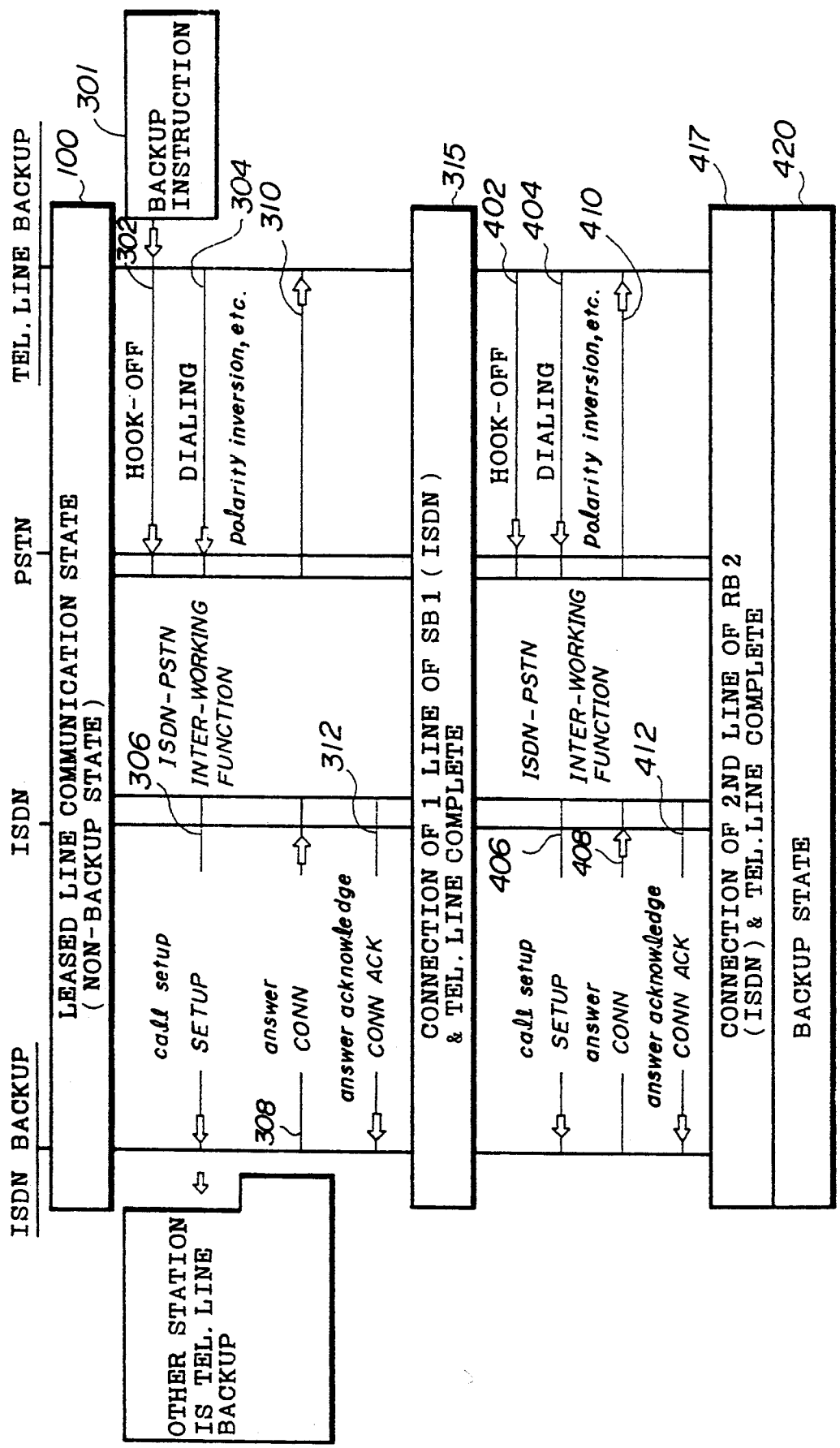
FIG. 10 is a diagram for explaining a backup connection sequence when providing a backup between an ISDN terminal and a telephone line terminal by transmission from the telephone line terminal.

When the backup instruction is supplied from the subscriber B when the failure is generated on the leased line 30 which is used for the communication between the subscribers A and B, an offhook signal HOOK-OFF which is generated in response to the backup instruction is transmitted from the telephone line backup unit 44 to the PSTN 40 in a step 302 shown in FIG. 10, similarly as in the conventional case where a backup line is formed via the telephone line switching network (PSTN). Hence, the telephone number of the subscriber A which is communicating is called in a step 304 by an automatic calling.

When the PSTN 40 receives the offhook signal HOOK-OFF and the telephone number, the PSTN 40 uses the ISDN-PSTN inter-working function to transmit a call setup message SETUP from the ISDN 38 to the ISDN backup unit 36 in a step 306. The ISDN backup unit 36 which receives the call setup message SETUP returns an answer message CONN to the ISDN 38 in a step 308. The ISDN 38 uses the ISDN-PSTN inter-working function to transmit a polarity inversion signal and the like from the PSTN 40 to the telephone line backup unit 44 in a step 310, and also returns an answer acknowledge message CONN_ACK to the ISDN backup unit 44 in a step 312. When this procedure of the connection process is completed, the transmitting B1-channel SB1 of the ISDN line 72 is connected in a step 315 to a first telephone line which is established between the PSTN 40 and the telephone line backup unit 44, thereby forming a first backup communication channel from the subscriber A to the subscriber B.

The messages used for making the connection control are the same as those used in the above described case where both backup units are ISDN backup units.

After forming the first backup communication channel from the subscriber A to the subscriber B, the following connection process is made automatically to form a second backup communication channel from the subscriber B to the subscriber A. The procedure for making this connection process is basically the same as the procedure used to form the first backup communication channel from the subscriber A to the subscriber B, as may be seen from steps 402, 404, 406, 408, 410 and 412 shown in FIG. 10.

At the ISDN backup unit 36 which receives the answer acknowledge message CONN_ACK, the controller 78 transfers switching control information to the ISDN interface circuit controller 80 via the control information line 76. Hence, a switching signal is supplied from the ISDN interface circuit controller 80 to the switching controller 58 to switch the switch 62 and also switch the switches 52 and 53. As a result, the receiving B2-channel RB2 of the ISDN line 74 is connected in a step 417 to a second telephone line which is established between the PSTN 40 and the telephone line backup unit 44, thereby forming the second backup communication channel from the subscriber B to the subscriber A. Therefore, a backup line (pair) is formed in a step 420 to backup the leased line 30 on which the failure is generated, and the communication between the subscribers A and B can be continued normally even after the failure is generated between the subscribers A and B on the leased line 30.

In the embodiments described above, the ISDN channels have the 2B+D channel structure. However, the present invention is not limited to such and other channel structures may be used instead.

Next, a description will be given of the general operation of the backup line system of the first and second embodiments, by referring to FIG. 11.

Figure 11:
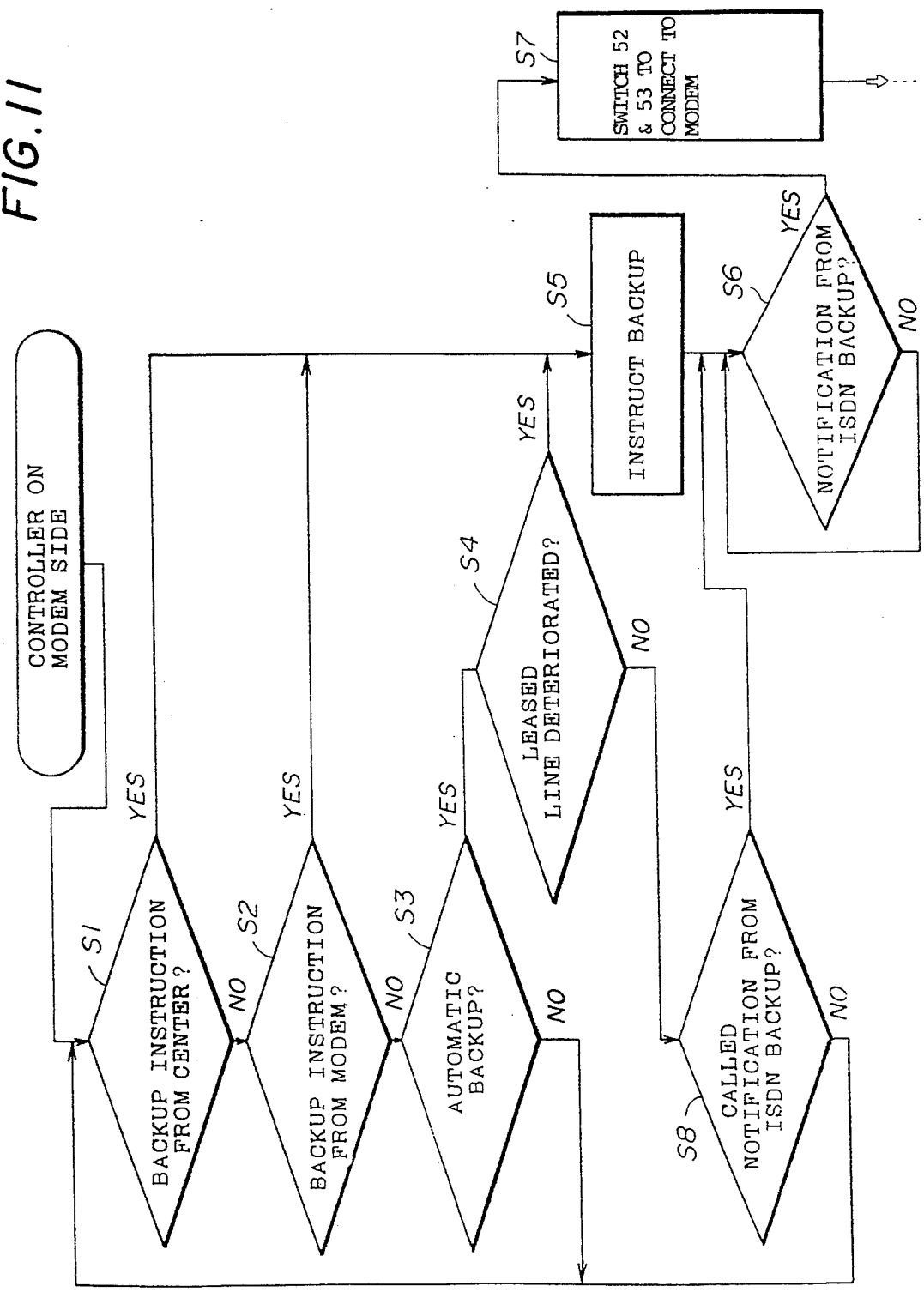
FIG. 11 is a flow chart generally showing a backup operation.

In FIG. 11, a step S1 decides whether or not a backup instruction is received from a supervising center (not shown) which supervises the communication system. If the decision result in the step S1 is NO, a step S2 decides whether or not the backup instruction is received from the modem 32 (or 34). If the decision result in the step S2 is NO, a step S3 decides whether or not the backup instruction is received by an automatic backup procedure which is started when the communication state of the leased line 30 deteriorates. The process returns to the step S1 when the decision result in the step S3 is NO.

If the decision result in the step S3 is YES, a step S4 decides whether or not the deterioration of the leased line 30 is such that a backup is necessary. The process advances to a step S5 if the decision result in one of the steps S1, S2 and S4 is YES. The step S5 instructs backup to the control parts 58 and 80 of the ISDN backup unit 36 (or 42). Then, a step S6 decides whether or not a notification indicating the completion of the necessary connection to realize the backup is received from the ISDN backup unit 36 (or 42). A step S7 switches the switches 52 and 53 to connect the modem 32 (or 34) to the ISDN lines 72 and 74 when the decision result in the step S6 becomes YES.

On the other hand, if the decision result in the step S4 is NO, a step S8 decides whether or not a called notification is received from the ISDN backup unit 36 (or 42). The process returns to the step S1 if the decision result in the step S8 is NO. But if the decision result in the step S8 is YES, the process advances to the step S6 described above.

Figure 12:
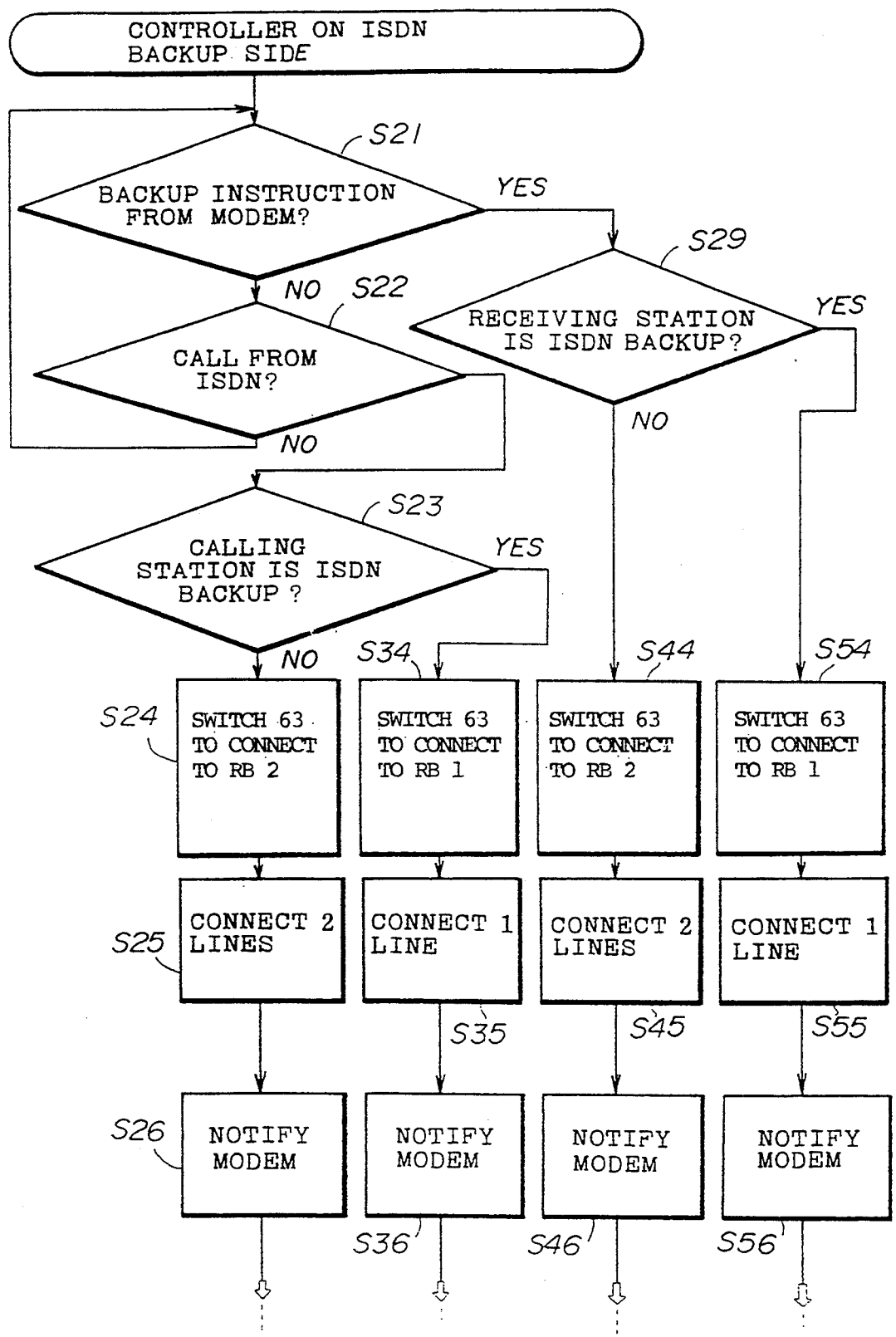
FIG. 12 is a flow chart for explaining an operation of a controller of the ISDN backup unit shown in FIG. 5.

FIG. 12 shows an operation of the controllers 58 and 80 of the ISDN backup unit 36 (or 42). The switching controller 58 may actually be a part of the ISDN interface circuit controller 80, and thus, for the sake of convenience, it will be assumed that the operation shown in FIG. 12 is carried out by the ISDN interface circuit controller 80.

A step S21 shown in FIG. 12 decides whether or not a backup instruction is received from a control part of the modem 32 (or 34). If the decision result in the step S21 is NO, a step S22 decides whether or not a call (call setup message) is received from the ISDN 38. The process returns to the step S21 if the decision result in the step S22 is NO. On the other hand, if the decision result in the step S22 is YES, a step S23 decides whether or not the calling station on the other end is an ISDN backup unit. The calling station at the time of reception (that is, when called) may be determined from the call setup information received from the network. For example, it may be determined that the calling station is an ISDN backup unit if the information transfer capability within the call setup information indicates "64 kbps unrestricted digital information" and that the calling station is a telephone line backup unit if the information transfer capability indicates "3.1 kHz audio". Steps S24 through S26 are carried out if the decision result in the step S23 is NO. On the other hand, steps S34 through S36 are carried out if the decision result in the step S23 is YES.

The step S24 switches the switch 63 to connect to the side of the receiving B2-channel RB2, the step S25 connects two lines (2B), and the step S26 notifies the completion of the connection to the control part of the modem 32. On the other hand, the step S34 switches the switch 63 to connect to the side of the receiving B1-channel RB1, the step S35 connects one line (1B), and the step S36 notifies the completion of the connection to the control part of the modem 32.

If the decision result in the step S21 is YES, a step S29 decides whether or not the receiving station on the other end is an ISDN backup unit. The destination station at the time of calling may be determined by the setting. For example, it may be determined that the destination station is an ISDN backup unit if the number of the set destination station is one and that the destination station is a telephone line backup unit if the number of the set destination station is two. Steps S44 through S46 are carried out if the decision result in the step S29 is NO. On the other hand, steps S54 through S56 are carried out if the decision result in the step S29 is YES.

The step S44 switches the switch 63 to connect to the side of the transmitting B2-channel SB2, the step S45 connects two lines (2B), and the step S46 notifies the completion of the connection to the control part of the modem 32. On the other hand, the step S54 switches the switch 63 to connect to the side of the transmitting B1-channel SB1, the step S55 connects one line (1B), and the step S56 notifies the completion of the connection to the control part of the modem 32.

Further, the present invention is not limited to these embodiments, but various variations and modifications may be made without departing from the scope of the present invention.

What is claimed is:

1. A communication line backup system which provides a backup line for backing up a communication line which connects first and second subscriber terminals when a failure is generated on the communication line between the first and second subscriber terminals, said communication line backup system comprising:

a first backup unit coupled to the first subscriber terminal;
a second backup unit coupled to the first subscriber terminal;
an integrated services digital network (ISDN) coupled to said first and second backup units via ISDN channels,
said first and second backup units further including backup means for forming a backup communication channel between the first and second subscriber terminals in response to the failure generated on the communication line between the first and second subscriber terminals,
said backup communication channel being formed by at least one channel within the ISDN channels established in said integrated services digital network,
said backup means of said first backup unit including backup instruction receiving means for receiving a backup instruction transmitted from an external device; and
said backup means at said first backup unit further including an ISDN interface circuit for converting bipolar type information into unipolar type information and for converting unipolar type information into bipolar type information.

2. A communication line backup system which provides a backup line for backing up a communication line which connects first and second subscriber terminals when a failure is generated on the communication the first and second subscriber terminals, said communication line backup system comprising:

a first backup unit coupled to the first subscriber terminal;
a second backup unit, coupled to the second subscriber terminal, for backing up a telephone line;
an integrated services digital network (ISDN) coupled to said first backup unit via ISDN channels; and
a telephone line switching network coupled between said second backup unit and said integrated services digital network,
said second backup unit being coupled to said telephone line switching network via two backup telephone lines,
said first backup unit including backup means for forming a backup communication channel to the failure generated on the communication line between the first and second subscriber terminals, wherein said backup means further includes backup instruction receiving means for receiving instruction transmitted from an external device, and an ISDN interface circuit for converting bipolar type information into unipolar type information and for converting unipolar type information into bipolar information
said backup communication channel being formed by a first channel which is within the ISDN channels established in said integrated services digital network and connects to one of the two backup lines, and a second channel which is within the ISDN channels established in said integrated services digital network and connects to the other of the two backup telephone lines.

3. The communication line backup system as claimed in claim 1, wherein:

each of the first and second subscriber terminals have a modem, and
the backup means of each of said first and second backup units includes switching means coupled to the communication line and an ISDN line of said integrated services digital network, and control means for controlling switching of said switching means, said control means controlling said switching means to normally connect the modem to the communication line and to connect the modem to the ISDN line in responded instruction which is received when a failure is generated on the communication line between the first and second subscriber terminals.

4. The communication line backup system as claimed in claim 1, wherein:

each of said first and second backup units include an ISDN interface circuit which is coupled between said switching means and the ISDN line, and said backup communication channel is formed by a B-channel within said integrated services digital network.

5. The communication line backup system of claim 4, wherein:

said ISDN interface circuit includes a format disassembling/assembling unit, a disassembling/assembling controller for controlling said disassembling/assembling unit, and a bipolar/unipolar converting circuit for coupling said format disassembling/assembling unit to line transformers, said line transformers coupling the bipolar/unipolar converting circuits to said ISDN.

6. The communication line backup system as claimed in claim 2, wherein:

each of the first and second subscriber terminals have a modem, and
the backup means of each of said first and second backup units includes switching means coupled to the communication line and an ISDN line of said integrated services digital network, and control means for controlling switching of said switching means, said control means controlling said switching means to normally connect the modem to the communication line and to connect the modem to the ISDN line in responded instruction which is received when a failure is generated on the communication line between the first and second subscriber terminals.

7. The communication line backup system as claimed in claim 2, wherein each of said first and second backup units include an ISDN interface circuit which is coupled between said switching means and the ISDN line, and said backup communication channel is formed by a B-channel within said integrated services digital network.

8. The communication line backup system of claim 7, wherein:

said ISDN interface circuit includes a format disassembling/assembling unit, a disassembling/assembling controller for controlling said disassembling/assembling unit, and a bipolar/unipolar converting circuit for coupling said format disassembling/assembling unit to line transformers, said line transformers coupling the bipolar/unipolar converting circuits to said ISDN.

* * * * *